United States Patent [19]

Itoh et al.

[11] 4,287,114
[45] Sep. 1, 1981

[54] PRIMER COMPOSITIONS

[75] Inventors: Kunio Itoh; Takeshi Fukuda; Masaaki Matumura, all of Annaka, Japan

[73] Assignee: Shin-Etsu Chemical Co., Ltd., Tokyo, Japan

[21] Appl. No.: 91,761

[22] Filed: Nov. 6, 1979

[30] Foreign Application Priority Data

Nov. 13, 1978 [JP] Japan ............................. 53-139686

[51] Int. Cl.$^3$ ..................... C08L 83/06; C08K 3/36
[52] U.S. Cl. ............................ 260/37 SB; 525/477; 525/479; 156/329
[58] Field of Search ..................... 525/477, 479; 260/37 SB

[56] References Cited

U.S. PATENT DOCUMENTS

| | | | |
|---|---|---|---|
| 2,803,619 | 8/1957 | Dickmann | 525/477 |
| 3,699,073 | 10/1972 | Wada et al. | 525/477 |
| 3,769,253 | 10/1973 | Stevenson | 525/477 |
| 3,779,986 | 12/1973 | Smith et al. | 525/477 |

*Primary Examiner*—Wilbert J. Briggs, Sr.
*Attorney, Agent, or Firm*—Toren, McGeady and Stanger

[57] ABSTRACT

The adhesive bonding of a silicone rubber to a metal surface can be very much improved by the use of the inventive primer composition, in particular, with respect to the heat resistance and anti-oil resistance of the adhesion. The inventive primer composition comprises (a) a substantially linear diorganopolysiloxane of gum-like consistency free from aliphatic unsaturation, (b) an organopolysiloxane with the organic group/silicon atom molar ratio of 1.9 to 2.3 and having a limited amount of vinyl groups directly bonded to the silicon atoms and a viscosity of 5 to 10,000 centistokes at 25° C., (c) an organopolysiloxane resin with the molar ratio of organic groups/silicon atoms of 0.5 to 1.7, (d) an organosilane compound such as vinyl trimethoxysilane or vinyl tris(2-methoxyethoxy) silane, (e) a finely divided silica filler, (f) an organic peroxide and (g) a curing agent for silicone resins, all in limited weight proportions.

11 Claims, No Drawings

PRIMER COMPOSITIONS

BACKGROUND OF THE INVENTION

The present invention relates to a primer composition or, more particularly, to a primer composition suitable for use in adhesively bonding by curing a silicone rubber belonging to the class curable by heating with admixture of an organic peroxide as the curing agent on to the surfaces of various kinds of metals as well as to a method for improving adhesive bonding of a silicone rubber to a metal surface by use of the primer composition.

When a silicone rubber composition is to be firmly bonded to the surface of a metal adhesively by subjecting the uncured silicone rubber composition to thermal curing as in contact with the metal surface, it is a usual practice that the metal surface is treated with a primer in advance before being brought into contact with the uncured silicone rubber composition. Known primers used for such a purpose include alkoxysilanes having an unsaturated bond such as vinyl trimethoxysilane, vinyl tris (2-methoxyethoxy) silane, 3-methacryloxypropyl trimethoxysilane and the like, partial hydrolysis condensation products of the above named silanes or mixtures composed of the organopolysiloxane as the hydrolysis product thereof with a titanic acid ester and a metal salt of an organic fatty acid, and peroxysilanes.

The above mentioned prior art primers are not satisfactory in respect of the thermal resistance of adhesive bonding over a long period of time when, for example, the silicone rubber bonded to the metal surface is heated at a temperature of 200° C. or higher prolongedly. This defect of insufficient thermal resistance is more remarkable when heating is performed in an oil bath at elevated temperatures. In particular, peroxysilanes as the primer are especially unsatisfactory in this regard since peeling off of the silicone rubber from the metal surface readily takes place when heated in a silicone fluid at 150° C. or higher.

SUMMARY OF THE INVENTION

An object of the present invention, which has been established by the extensive investigations by the inventors, is therefore to provide a novel and improved primer composition free from the above described drawbacks in the prior art primers capable of giving a very firm adhesive bonding between cured silicone rubbers and metal surfaces even after prolonged heating not only in dry air but also in silicone fluids.

The primer composition of the invention comprises (a) 100 parts by weight of an organopolysiloxane of substantially linear molecular structure represented by the average unit formula $$R_a{}^1 SiO_{\frac{4-a}{2}}, \quad (I)$$

where $R^1$ is a substituted or unsubstituted monovalent hydrocarbon group and a is a positive number in the range from 1.98 to 2.01, and having a viscosity larger than 100,000 centistokes at 25° C., (b) from 5 to 100 parts by weight of a vinyl-containing organopolysiloxane represented by the average unit formula $$R_b{}^2 SiO_{\frac{4-b}{2}}, \quad (II)$$

where $R^2$ is a substituted or unsubstituted monovalent hydrocarbon group and b is a positive number in the range from 1.9 to 2.3, from 0.03 to 1 of the groups represented by $R^2$ per silicon atom in a molecule in an average being vinyl groups, and having a viscosity from 5 to 10,000 centistokes at 25° C., (c) from 5 to 100 parts by weight of an organopolysiloxane resin represented by the average unit formula $$R_c{}^3 SiO_{\frac{4-c}{2}}, \quad (III)$$

where $R^3$ is a substituted or unsubstituted monovalent hydrocarbon group and c is a positive number in the range from 0.5 to 1.7, (d) from 0.5 to 200 parts by weight of an organosilane compound represented by the general formula $$R^4 Si(OR^5)_3, \quad (IV)$$

where $R^4$ is an aliphatically unsaturated monovalent hydrocarbon group and $R^5$ is a monovalent group selected from the class consisting of alkyl groups having 1 to 5 carbon atoms, 2-methoxyethyl and 2-ethoxyethyl groups, (e) from 5 to 100 parts by weight of a silica filler having a specific surface area of at least 100 m$^2$/g, (f) from 0 to 10 parts by weight of an organic peroxide, (g) from 0.5 to 50 parts by weight of a condensation catalyst, and (g) an organic solvent, if necessary.

The above defined composition is very suitable as a primer for adhesively bonding a silicone rubber to various metal surfaces firmly and the adhesive strength of bonding is retained even after prolonged heating at elevated temperatures as dipped in a hot silicone fluid without peeling of the silicone rubber off the metal surface.

DETAILED DESCRIPTION OF THE PREFERRED EMBODIMENTS

The organopolysiloxane as the component (a) in the inventive composition is a diorganopolysiloxane having a substantially linear molecular structure represented by the average unit formula (I) above composed of diorganosiloxane units. The viscosity of this organopolysiloxane should be higher than 100,000 centistokes at 25° C. or, preferably, sufficiently high so as that the organopolysiloxane has a consistency of so-called silicone gums used in formulating a silicone rubber composition. The substituted or unsubstituted monovalent hydrocarbon group represented by the symbol $R^1$ in the formula is exemplified by alkyl groups such as methyl, ethyl and propyl groups, cycloalkyl groups, alkenyl groups, cycloalkenyl groups and aryl groups as well as halogenated hydrocarbon groups, e.g. 3-trifluoropropyl group, cyanosubstituted hydrocarbon groups and the like. Typically, the component (a) is a dimethylpolysiloxane of a linear molecular structure, of which part of the methyl groups may be substituted with other hydrocarbon groups such as phenyl and vinyl groups. It should be noted that, when the component (a) has vinyl groups bonded to the silicon atoms as the hydrocarbon groups, the ratio of the number of the vinyl groups to the number of the silicon atoms is limited to 0.005 or smaller.

The organopolysiloxane as the component (b) is represented by the average unit formula (II) above, in which $R^2$ denotes a substituted or unsubstituted monovalent hydrocarbon group such as methyl, ethyl, propyl, vinyl and phenyl groups as well as those groups obtained by the substitution of part or all of the hydrogen atoms in the above mentioned hydrocarbon groups with the substituent atoms or groups such as halogen atoms and cyano groups, e.g. 3-trifluoropropyl group. It is necessary that, different from the component (a), the component (b) must have vinyl groups directly bonded to the silicon atoms in such a number that the ratio of the number of the vinyl groups to the number of the silicon atoms is in the range from 0.03 to 1. The viscosity of the component (b) is preferably in the range from 5 to 10,000 centistokes or, more preferably, from 20 to 5000 centistokes at 25° C.

The organopolysiloxane as the component (b) can be prepared readily, for example, by the cohydrolysis of a mixture of organochlorosilanes such as dimethyldichlorosilane, methylvinyldichlorosilane, methylphenyldichlorosilane, 3-trifluoropropylmethyldichlorosilane and the like in a suitable mixing ratio followed by the condensation polymerization of the low molecular weight organopolysiloxane as the hydrolysis product or by the ring-opening polymerization of a cyclic organopolysiloxane such as hexaorganocyclotrisiloxane, octaorganocyclotetrasiloxane and the like when the number b is equal or close to 2.

The amount of the component (b) in the inventive composition should be in the range from 5 to 100 parts by weight or, preferably, from 10 to 60 parts by weight per 100 parts by weight of the component (a) because smaller amounts of the component (b) than 5 parts by weight cannot impart a satisfactory adhesive strength to the composition on to the metal surface while larger amounts than 100 parts by weight unduly increase the curing velocity of the primer so that no satisfactory bonding strength is obtained.

The organopolysiloxane resin as the component (c) is represented by the above given average unit formula (III) and well known in the art of silicones. In the formula, $R^3$ is a substituted or unsubstituted monovalent hydrocarbon group exemplified by methyl, ethyl, propyl, vinyl and phenyl groups as well as halogenated hydrocarbon groups. The number c in the formula is in the range from 0.5 to 1.7 or, preferably, from 1.2 to 1.5.

The organopolysiloxane resin as the component (c) can be prepared readily by the cohydrolysis of a mixture of organochlorosilanes having the molar ratio of the organic groups to the silicon atoms in the range defined for the above value of c composed of organochlorosilanes such as methyltrichlorosilane, dimethyldichlorosilane, phenyltrichlorosilane, diphenyldichlorosilane, methylphenyldichlorosilane, vinyltrichlorosilane, methylvinyldichlorosilane, 3-trifluoropropyltrichlorosilane and the like.

The amount of the component (c) in the inventive composition should be in the range from 5 to 100 parts by weight or, preferably, from 10 to 60 parts by weight per 100 parts by weight of the component (a) since smaller amounts than 5 parts cannot impart a sufficient mechanical strength to the film of the cured primer composition so that the adhesive bonding strength will be unsatisfactory while larger amounts than 100 parts by weight result in a rather fragile film of the cured primer composition so that the durability of the adhesive bonding will be reduced.

The organosilane compound as the component (d) is represented by the above given general formula (IV), in which $R^4$ is an aliphatically unsaturated hydrocarbon group such as vinyl and ethynyl groups and $R^5$ is a group selected from the class consisting of alkyl groups having 1 to 5 carbon atoms, 2-methoxyethyl group and 2-ethoxyethyl group. Examples of the organosilane compound suitable as the component (d) are vinyl trimethoxysilane, vinyl triethoxysilane, vinyl tributoxysilane vinyl tris (2-methoxyethoxy) silane and the like.

The amount of the component (d) in the inventive composition is preferably in the range from 0.5 to 200 parts by weight per 100 parts by weight of the component (a). This is because smaller amounts than 0.5 part by weight cannot give the desired adhesive bonding strength while larger amounts than 200 parts by weight not only result in a decreased stability of the composition in storage but also adversely affect the mechanical strength of the cured films of the composition.

The silica filler as the component (e) may be conventional finely divided silica fillers used in the formulation of silicone rubbers such as so-called fumed silica fillers and precipitated silica fillers. The silica filler has desirably a specific surface area of at least 100 $m^2/g$ in order that the reinforcing effect on the mechanical strengths of the cured primer films is fully exhibited. It is also recommendable that the surface of the silica filler is rendered hydrophobic by the treatment with an organochlorosilane such as trimethylchlorosilane so as that the adhesive strength between the metal surface and the silicone rubber can be further enhanced.

The amount of the silica filler as the component (e) is preferably in the range from 5 to 100 parts by weight per 100 parts by weight of the component (a). This is because smaller amounts than 5 parts by weight cannot give the desired mechanical strength of the cured film with consequent decrease in the durability of the bonding, especially, in a hot oil while larger amounts than 100 parts by weight also result in inferior mechanical strength of the cured film along with markedly increased consistency of the primer composition which is disadvantageous from the standpoints of storage stability of the composition and workability in application of the composition.

The organic peroxide as the component (f) serves as the heat curing catalyst of the primer composition and any kind of the known organic peroxides used in the curing of silicone rubbers can be used. Some of the examples of the organic peroxide are dicumyl peroxide, tert-butyl perbenzoate, 2,5-dimethyl-2,5-di(tert-butylperoxy) hexane and the like.

The amount of the organic peroxide as the component (f) in the inventive composition is preferably in the range not exceeding 10 parts by weight per 100 parts by weight of the component (a).

The organic peroxide as the component (f) is not an essential ingredient in the inventive primer composition because, when the silicone rubber compound to be adhesively bonded to the metal surface belongs to a class of silicone rubbers curable with an organic peroxide as the crosslinking catalyst, the organic peroxide contained in the silicone rubber compound migrates to the primer in contact therewith through the interface so that the primer composition per se as prepared may be free from any organic peroxide. It is, however, recommendable that the primer composition is admixed with from 1 to 8 parts by weight of an organic peroxide per 100 parts by weight of the component (a) because the addition of an organic peroxide can prevent flowing of the primer layer in the bonding fabrication so as that a uniformity in the cured film of the primer composition can be ensured by baking at an elevated temperature giving rise to a sufficient bonding strength.

The condensation catalyst as the component (g) in the inventive composition has a function, different from the organic peroxide as the component (f), as a drier with which the surface of the substrate treated with the primer composition becomes rapidly tackfree and also serves to impart further increased strength of the adhesive bonding. The condensation catalyst as the component (g) can be a conventional catalyst usually used for curing silicone resins including carboxylates of divalent tin such as tin dilaurate and tin dioctoate, carboxylates of tetravalent tin such as dibutyltin dilaurate and dibutyltin di (2-ethylhexylate) and organic esters of tetravalent titanic acid such as tetrabutyl titanate and tetrapropyl titanate as well as various kinds of amine compounds.

The amount of the condensation catalyst as the component (g) in the inventive composition is preferably in the range from 0.5 to 50 parts by weight per 100 parts by weight of the component (a).

In order to increase the storage stability of the primer composition and also to improve the workability in the works of application of the composition by decreasing the consistency, it is desirable that the primer composition of the invention is diluted with a suitable amount of an organic solvent as the component (h) having compatibility with the above described components (a) to (g). The organic solvent suitable for the purpose is exemplified by aromatic hydrocarbon solvents such as toluene and xylene and chlorinated hydrocarbon solvents such as perchloroethylene and trichloroethane as well as certain aliphatic hydrocarbon solvents such as n-hexane and low molecular weight silanes or polysiloxanes such as tetraethylsilane and hexamethyldisiloxane. When the components (a) and/or (b) have 3-trifluoropropylmethylsiloxane units, in particular, ketone solvents such as acetone and methylethylketone and ester solvents such as ethyl acetate may also be used.

Alcoholic solvents are desirable from the standpoint of improving the storage stability of the primer composition by preventing the premature gelation of the composition due to the hydrolysis of the component (d). Such alcoholic solvents are, however, poorly miscible with the organopolysiloxane components (a), (b) and (c) so that the amount of an alcoholic solvent is limited to, say, 25% by weight or smaller based on the total amount of the organic solvents used. The total amount of the solvents as the component (h) is determined, of course, by the consideration of the consistency and the storage stability of the resultant primer composition.

The primer composition of the present invention can be prepared by merely blending the above described components (a) to (h) in desired weight ratios uniformly by a suitable mechanical mixing means.

In the formulation of the inventive primer composition, it is optional or rather desirable to add a metal oxide such as iron oxide, ceric oxide, titanium dioxide and the like in an amount from 5 to 20 parts by weight per 100 parts by weight of the component (a) whereby the durability of the adhesive bonding strength can be further increased even in an atmosphere at an elevated temperature. Among the above named metal oxides, iron oxide is the most preferred.

When a silicone rubber is to be adhesively bonded to the surface of a metal substrate by use of the inventive primer composition, the amount of the primer composition to be applied to the substrate surface is desirably at least in the range from 5 $g/m^2$ to 1000 $g/m^2$ or, more preferably, from 10 $g/m^2$ to 500 $g/m^2$ calculated as the total amount of the components (a) to (g) and it is desirable to subject the layer of the primer composition after application to air-drying for 15 to 30 minutes at room temperature.

The inventive primer composition is advantageously used for increasing the adhesive bonding strength between a metal surface and a silicone rubber regardless of the types of the silicone rubber including dimethyl silicone rubbers, methylvinyl silicone rubbers, phenylmethylvinyl silicone rubbers, 3-trifluoropropylmethylvinyl silicone rubbers and the like. Applicable metals include iron, copper aluminum, zinc and the like as well as alloys thereof such as stainless steel and brass. The inventive primer composition is also effective for improving the adhesive bonding between a silicone rubber and shaped articles of a synthetic resin such as polyethylene, polypropylene, acrylic resins, polycarbonate resins, polyesters, phenolic resins and the like. It is particularly advantageously used when extension of the durability of the adhesive bonding between a metal surface and a silicone rubber is desired even at an elevated temperature in dry or in a hot oil such as a silicone fluid.

An additional advantage in the use of the inventive primer composition is that the effectiveness of the primer is rather insensitive to various parameters in the practical application such as the drying time, pressure in the compression molding of the silicone rubber and the like. The problem of the plastic flow of the primer layer in the compression molding of the silicone rubber, which is very difficult to solve in the conventional primer compositions, can be completely eliminated when the inventive primer composition is subjected to baking at an elevated temperature e.g. 150° to 250° C. for 0.5 to 60 minutes after application to the substrate surface and air-drying to form a very tenacious film free from plastic flow on the surface without decrease in the priming effect.

Taking advantage of the above described improvement in the adhesive bonding between a metal surface and a silicone rubber, several of the application fields of the inventive primer composition are, for example, parts of oil seals employed in a hot oil, parts used around internal combustion engines, parts for exhaust pipes and the like as the typical examples in the field of automobiles among transportation machines as well as printing or image-reproducing technology represented by the rubber rollers in electrophotographic copying machines and household electric appliances.

In the following, examples are given to illustrate the preparation and application of the inventive primer compositions in further detail but not to limit the scope of the present invention in any way. In the examples, parts are all given by parts by weight.

EXAMPLE 1

A primer composition according to the present invention, which was designated as Primer No. 1, was prepared by uniformly blending: 100 parts of a diorganopolysiloxane composed of 99.6% by moles of dimethylsiloxane units and 0.04% by moles of methylvinylsiloxane units and having a viscosity of about 5,000,000 centistokes at 25° C.; 60 parts of a methylvinylpolysiloxane having a viscosity of 500 centistokes at 25° C., in which the molar ratio of the vinyl groups to the silicon atoms was 0.1; 35 parts of an organopolysiloxane resin composed of 30% by moles of methylsiloxane units, 30% by moles of dimethylsiloxane units, 35% by moles of phenylsiloxane units and 5% by moles of diphenylsiloxane units and having 0.12 mole/100 g of hydroxy groups directly bonded to the silicon atoms; 100 parts of vinyl tris(2-methoxyethoxy) silane, 25 parts of a fumed silica filler having a specific surface area of 200 m²/g; 4 parts of dicumyl peroxide; 15 parts of tin dilaurate; 800 parts of toluene; 250 parts of trichloroethylene and 150 parts of isopropyl alcohol.

Two well-polished aluminum plates, each having dimensions of 100 mm (length)×25.4 mm (width)×0.3 mm (thickness), were each coated with the above prepared Primer No. 1 on a 2.54 cm long portion at one end thereof to give a coated area of just 1 square inch followed by air-drying of the composition for 30 minutes. A curable silicone rubber compound prepared by blending 0.6% by weight of dicumyl peroxide with a commercial silicone rubber compound KE 555U available from Shin-Etsu chemical Co., Japan, in a layer of 2 mm thickness was sandwiched between the primer-coated portions of the aluminum plates in such a manner that the uncoated portions of the aluminum plates extended in the reverse directions and the silicone rubber compound was subjected to heat-curing by heating at 165° C. for 10 minutes under a pressure of 30 kg/cm² to bond the aluminum plates together.

The above prepared test specimen was heated for 35 days either in an air oven at 250° C. or as immersed in a dimethylsilicone fluid having a viscosity of 100 centistokes at 25° C. kept at 200° C. The thus heattreated test specimen was subjected to a tensile test by pulling at the free portions of the plates by use of a tensile tester at a velocity of 500 mm/minute and the load in kg at the moment of break was recorded which was divided by the bonded area, i.e. 2.54 cm×2.54 cm, to give the adhesive bonding strength in kg/cm².

Further, the area covered by the debris of the silicone rubber layer on the aluminum plates after pulling apart of the plates of the test specimen was visually determined and the approximate percentage of the covered area relative to the initially bonded area, i.e. 2.54 cm×2.54 cm, was calculated. The results of these tests are set out in Table 1 together with the values for the test specimen before heating in air or in the silicone fluid.

EXAMPLE 2

A primer composition, designated as Primer No. 2, was prepared by uniformly blending: 100 parts of a dimethylpolysiloxane substantially composed of dimethylsiloxane units and having a viscosity of about 7,000,000 centistokes at 25° C.; 20 parts of a methylvinylpolysiloxane having a viscosity of 200 centistokes at 25° C., of which the molar ratio of the vinyl groups to the silicon atoms was 0.5; 20 parts of an organopolysiloxane resin composed of 30% by moles of methylsiloxane units, 30% by moles of dimethylsiloxane units, 35% by moles of phenylsiloxane units and 5% by moles of diphenylsiloxane units and containing 0.12 mole/100 g of silanol groups; 50 parts of vinyl tris(2-methoxyethoxy) silane; 20 parts of a fumed silica having a specific surface area of 200 m²/g; 6 parts of dicumyl peroxide; 5 parts of tin dilaurate; 800 parts of toluene; 100 parts of trichloroethylene and 100 parts of isopropyl alcohol.

The adhesive bonding tests were carried out with Primer No. 2 in the same manner as in Example 1 to give the results shown in Table 1.

EXAMPLE 3

A primer composition, designated as Primer No. 3, was prepared by uniformly blending: 100 parts of a methylvinylpolysiloxane composed of 99.9% by moles of dimethylsiloxane units and 0.1% by moles of methylvinylsiloxane units and having a viscosity of about 4,000,000 centistokes at 25° C.; 10 parts of a methylvinylpolysiloxane having a viscosity of about 1000 centistokes at 25° C., of which the molar ratio of the vinyl groups to the silicon atoms was 0.1; 20 parts of an organopolysiloxane resin composed of 25% by moles of methylsiloxane units, 55% by moles of phenylsiloxane units and 20% by moles of diphenylsiloxane units and containing 0.18 mole/100 g of silanol groups; 20 parts of vinyl tris(2-methoxyethoxy) silane; 45 parts of a fumed silica having a specific surface area of 200 m²/g and surface-blocked with trimethylsiloxy groups; 7.5 parts of dicumyl peroxide; 1 part of tetrabutyl titanate and 1200 parts of toluene.

The adhesive bonding tests were carried out with Primer No. 3 in the same manner as in Example 1 to give the results shown in Table 1.

EXAMPLE 4

A primer composition, designated as Primer No. 4, was prepared by uniformly blending: 100 parts of a methylvinylpolysiloxane composed of 99.5% by moles of dimethylsiloxane units and 0.5% by moles of methylvinylsiloxane units and having a viscosity of about 500,000 centistokes at 25° C.; 40 parts of a methylvinylpolysiloxane having a viscosity of 100 centistokes at 25° C., of which the molar ratio of vinyl groups to silicon atoms was 0.05; 60 parts of an organopolysiloxane resin composed of monofunctional siloxane units and tetrafunctional $SiO_2$ units in a molar ratio of 1.2:1, the monofunctional siloxane units being composed of 92%

TABLE 1

| Primer No. | | Adhesive bonding strength, kg/cm² | | | | | | Area covered by rubber debris, % | | | | | |
|---|---|---|---|---|---|---|---|---|---|---|---|---|---|
| | | 1 | 2 | 3 | 4 | 5 | 6 | 1 | 2 | 3 | 4 | 5 | 6 |
| Initial | | 38 | 40 | 40 | 35 | 42 | 35 | 100 | 100 | 100 | 100 | 100 | 100 |
| After heating in air at 250° C. for: | 3 days | 30 | 27 | 28 | 25 | 12 | 8 | 100 | 100 | 100 | 100 | 60 | 40 |
| | 10 days | 25 | 20 | 24 | 18 | 4 | 1 | 100 | 30 | 100 | 70 | 20 | 0 |
| | 20 days | 20 | 12 | 20 | 10 | 1 | — | 80 | 50 | 70 | 40 | 0 | — |
| After heating in silicon fluid at 200° C. for: | 3 days | 36 | 35 | 37 | 30 | 2 | 1 | 100 | 100 | 100 | 100 | 0 | 0 |
| | 7 days | 34 | 32 | 35 | 27 | — | — | 100 | 100 | 100 | 80 | — | — |
| | 10 days | 34 | 28 | 34 | 24 | — | — | 100 | 80 | 100 | 60 | — | — | by moles of trimethylsiloxane units and 8% by moles of dimethylvinylsiloxane units, and containing 0.05 mole/100 g of silanol groups; 10 parts of vinyltrimethoxysilane; 60 parts of a fumed silica having a specific surface area of 200 m²/g and surface-blocked with dimethylsiloxy groups; 2 parts of tert-butyl perbenzoate; 20 parts of tetrapropyl titanate; 1500 parts of toluene and 100 parts of ethyl alcohol.

The adhesive bonding tests were carried out with Primer No. 4 in the same manner as in Example 1 to give the results shown in Table 1.

COMPARATIVE EXAMPLE 1

A primer composition, Primer No. 5, was prepared by dissolving 200 parts of vinyl tris(tert-butylperoxy) silane expressed by the formula

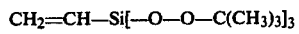

$$CH_2=CH-Si[-O-O-C(CH_3)_3]_3$$

in 200 parts of n-hexane.

The adhesive bonding tests were carried out with Primer No. 5 in the same manner as in Example 1 to give the results shown in Table 1.

COMPARATIVE EXAMPLE 2

A primer composition, Primer No. 6, was prepared by uniformly blending 100 parts of vinyltrimethoxysilane, 50 parts of tin dilaurate and 850 parts of ligroin.

The adhesive bonding tests were carried out with Primer No. 6 in the same manner as in Example 1 to give the results shown in Table 1.

EXAMPLE 5

The priming effects of Primer No. 1 and Primer No. 5 prepared in Example 1 and comparative Example 1, respectively, were tested with test panels of stainless steel, iron and copper instead of aluminum in the same manner as in Example 1 to give the results shown in Table 2.

EXAMPLE 6

Seven kinds of Primers No. 7 to No. 13 were prepared each by uniformly blending: 100 parts of the same methylvinyl polysiloxane having a viscosity of about 4,000,000 centistokes at 25° C. as used in Example 3; 50 parts of the same methylvinylpolysiloxane having a viscosity of 1000 centistokes at 25° C. also as used in Example 3; 20 parts of the same organopolysiloxane resin as used in Example 3; 50 parts of vinyl tris (2-methoxyethoxy) silane; 30 parts of the same fumed silica as used in Example 3; 5 parts of dicumyl peroxide and 10 parts of tetrabutyl titanate with omission of each of the second methylvinylpolysiloxane, the organopolysiloxane resin, the silane compound, the fumed silica, dicumyl peroxide and tetrabutyl titanate in each of Primers No. 8 to No. 13, respectively, followed by dissolving each of the above compositions in a mixed solvent of 1200 parts of toluene and 100 parts of isopropyl alcohol.

The adhesive bonding tests were carried out in the same manner as in Example 1 with these primer compositions to give the results shown in Table 3 below.

EXAMPLE 7

Primers No. 14 and No. 15 were prepared each by uniformly admixing 5 parts or 15 parts of iron oxide, respectively, in 100 parts of the Primer No. 1 prepared in Example 1.

The adhesive bonding tests were carried out with these Primers No. 14 and No. 15 as well as with Primer No. 1 as such in the same manner as in Example 1 except that the silicone rubber compound was KE 552U, a product by Shin-Etsu Chemical Co., Japan, instead of KE 555U to give the results shown in Table 4 below.

TABLE 3

| Primer No. | Adhesive bonding strength, kg/cm² | | | | | | | Area covered by rubber debris, % | | | | | | |
|---|---|---|---|---|---|---|---|---|---|---|---|---|---|---|
| | 7 | 8 | 9 | 10 | 11 | 12 | 13 | 7 | 8 | 9 | 10 | 11 | 12 | 13 |
| Initial | 42 | 32 | 35 | 24 | 38 | 40 | 28 | 100 | 100 | 100 | 100 | 100 | 100 | 80 |
| After heating in silicone fluid at 200° C. for: 3 days | 40 | 25 | 27 | 12 | 34 | 37 | 21 | 100 | 80 | 70 | 40 | 80 | 100 | 50 |
| 7 days | 38 | 16 | 18 | 1 | 24 | 32 | 12 | 100 | 40 | 40 | 0 | 50 | 100 | 20 |
| 14 days | 38 | 2 | 10 | — | 18 | 27 | 1 | 100 | 0 | 20 | — | 40 | 80 | 0 |
| 21 days | 34 | — | 1 | — | 8 | 18 | — | 80 | — | 0 | — | 10 | 50 | — |

TABLE 4

| Primer No. | | Adhesive bonding strength, kg/cm² | | | Area covered by rubber debris, % | | |
|---|---|---|---|---|---|---|---|
| | | 1 | 14 | 15 | 1 | 14 | 15 |
| Initial | | 40 | 43 | 38 | 100 | 100 | 100 |
| After heating in air at 250° C. for: | 10 days | 24 | 27 | 26 | 100 | 100 | 100 |
| | 20 days | 18 | 24 | 20 | 100 | 100 | 100 |
| | 30 days | 14 | 20 | 17 | 100 | 100 | 100 |
| After heating in silicone fluid at 200° C. for: | 5 days | 34 | 36 | 34 | 100 | 100 | 100 |
| | 10 days | 32 | 35 | 34 | 100 | 100 | 100 |

TABLE 2

| Primer No. | | 1 | | | 5 | | | 1 | | | 5 | | |
|---|---|---|---|---|---|---|---|---|---|---|---|---|---|
| | | Adhesive bonding Strength, kg/cm² | | | | | | Area covered by rubber debris, % | | | | | |
| Test panels | | S.S.* | Iron | Copper | S.S.* | Iron | Copper | S.S.* | Iron | Copper | S.S.* | Iron | Copper |
| Initial | | 40 | 39 | 35 | 42 | 38 | 34 | 100 | 100 | 100 | 100 | 100 | 100 |
| After heating in air at 250° C. for: | 1 day | 32 | 31 | 28 | 20 | 17 | 15 | 100 | 100 | 100 | 80 | 70 | 50 |
| | 3 days | 28 | 27 | 22 | 10 | 8 | 7 | 100 | 100 | 100 | 50 | 40 | 20 |
| | 7 days | 22 | 23 | 20 | 7 | 7 | 3 | 90 | 70 | 60 | 20 | 20 | 0 |
| After heating in silicone fluid at 200° C. for: | 3 days | 35 | 32 | 31 | 2 | 1 | 1 | 100 | 100 | 100 | 0 | 0 | 0 |
| | 7 days | 34 | 32 | 31 | — | — | — | 100 | 100 | 60 | — | — | — |

*Stainless Steel

EXAMPLE 8

A primer composition, designated as Primer No. 16, was prepared by uniformly blending: 100 parts of a 3-trifluoropropylmethylvinylpolysiloxane composed of 99.8% by moles of 3-trifluoropropylmethylsiloxane units and 0.2% by moles of methylvinylsiloxane units and having a viscosity of about 10,000,000 centistokes at 25° C.; 10 parts of a 3-trifluoropropylmethylvinylpolysiloxane having a viscosity of 500 centistokes at 25° C., in which the molar ratio of the vinyl groups to the silicon atoms was 0.1; 10 parts of the same organopolysiloxane resin as used in Example 4; 100 parts of vinyl tris(2-methoxyethoxy) silane; 16 parts of a fumed silica having a specific surface area of 380 m²/g; 2 parts of dicumyl peroxide; 20 parts of tin dilaurate; 800 parts of methylethylketone and 400 parts of ethyl acetate.

TABLE 5

| Primer No. | | Adhesive bonding strength, kg/cm² 16 | | | | Area covered by rubber debris, % 16 | | | |
|---|---|---|---|---|---|---|---|---|---|
| Test panels | | Aluminum | S.S.* | Iron | Copper | Aluminum | S.S.* | Iron | Copper |
| Initial | | 35 | 37 | 40 | 28 | 100 | 100 | 100 | 100 |
| After heating in air at 200° C. for: | 3 days | 32 | 35 | 38 | 25 | 100 | 100 | 100 | 100 |
| | 7 days | 29 | 30 | 32 | 21 | 100 | 100 | 100 | 80 |
| | 14 days | 24 | 21 | 26 | 16 | 80 | 70 | 80 | 70 |
| After heating in silicone fluid at 180° C. for: | 3 days | 32 | 34 | 35 | 24 | 100 | 100 | 100 | 100 |
| | 7 days | 31 | 34 | 32 | 20 | 100 | 100 | 100 | 80 |

*Stainless steel

The adhesive bonding tests with the above prepared Primer No. 16 were carried out in the same manner as in Example 1 except that the curable silicone rubber compound was prepared by admixing 0.5% by weight of 2,5-dimethyl-2,5-di(tert-butylperoxy) hexane into a silicone rubber compound FE 251U (a product by Shin-Etsu Chemical Co., Japan) using test panels of aluminum, stainless steel, iron and copper and the temperature of the heating tests in air and in the silicone fluid were 200° C. and 180° C., respectively. The results are shown in Table 5.

EXAMPLE 9

Pairs of test panels made of a polyethylene, acrylic resin, phenolic resin and Noryl resin (a product by General Electric Co.) were coated on the surface with Primer No. 2 or No. 6 and each pair of the panels was bonded together by sandwiching layer of a curable silicone rubber compound prepared by admixing 0.5% by weight of 1,1-bis(tert-butylperoxy)-3,3,5-trimethylcyclohexane into a silicone rubber compound KE 650 U a product by Shin-Etsu Chemical Co., Japan), which was subjected to curing by heating at 140° C. for 15 minutes under a pressure of 30 kg/cm².

The adhesion of the test panels was satisfactory for any of the materials of the panels when Primer No. 2 was used and the bonding strength was kept unchanged after heating for 14 days in water at 80° C.

When Primer No. 6 was used, on the other hand, the test panels of polyethylene and acrylic resin were not bonded adhesively while the other panels were adhesively bonded although the bonding strengths were less resistant in the heating test in hot water as described above.

What is claimed is:

1. A primer composition which comprises
    (a) 100 parts by weight of an organopolysiloxane of substantially linear molecular structure represented by the average unit formula $$R_a^1 SiO_{\frac{4-a}{2}},$$

where $R^1$ is a substituted or unsubstituted monovalent hydrocarbon group substantially free from aliphatic unsaturation and a is a positive number in the range from 0.98 to 2.01, and having a viscosity larger than 100,000 centistokes at 25° C.,
    (b) from 5 to 100 parts by weight of a vinyl-containing organopolysiloxane represented by the average unit formula $$R_b^2 SiO_{\frac{4-b}{2}},$$

where $R^2$ is a substituted or unsubstituted monovalent hydrocarbon group and b is a positive number in the range from 1.9 to 2.3, from 0.03 to 1 of the groups represented by $R^2$ per silicon atom in a molecule being vinyl groups, and having a viscosity from 5 to 10,000 centistokes at 25° C.,
    (c) from 5 to 100 parts by weight of an organopolysiloxane resin represented by the average unit formula $$R_c^3 SiO_{\frac{4-c}{2}},$$

where $R^3$ is a substituted or unsubstituted monovalent hydrocarbon group and c is a positive number in the range from 0.5 to 1.7,
    (d) from 0.5 to 200 parts by weight of an organosilane compound represented by the general formula $$R^4 Si(OR^5)_3,$$

where $R^4$ is an aliphatically unsaturated monovalent hydrocarbon group and $R^5$ is a monovalent group selected from the class consisting of alkyl groups having 1 to 5 carbon atoms, 2-methoxyethyl and 2-ethoxyethyl groups,
    (e) from 5 to 100 parts by weight of a silica filler having a specific surface area of at least 100 m²/g,
    (f) from 0 to 10 parts by weight of an organic peroxide, and
    (g) from 0.5 to 50 parts by weight of a condensation catalyst.

2. The primer composition as claimed in claim 1 wherein the group represented by $R^1$ is a methyl group or a phenyl group.

3. The primer composition as claimed in claim 1 wherein the group represented by $R^2$ is a group selected from the class consisting of methyl, phenyl and vinyl groups.

4. The primer composition as claimed in claim 1 wherein the groups represented by $R^3$ is a group selected from the class consisting of methyl, phenyl and vinyl groups.

5. The primer composition as claimed in claim 1 wherein the number c is in the range from 1.2 to 1.5.

6. The primer composition as claimed in claim 1 wherein the group represented by $R^4$ is a vinyl or an ethynyl group.

7. The primer composition as claimed in claim 1 wherein the organosilane compound as the component (d) is vinyl trimethoxysilane or vinyl tris(2-methoxyethoxy) silane.

8. The primer composition as claimed in claim 1 wherein the organic peroxide is selected from the class consisting of dicumyl peroxide, tert-butylperbenzoate and 2,5-dimethyl-2,5-di(tertbutylperoxy) hexane.

9. The primer composition as claimed in claim 1 wherein component (g) is selected from the class consisting of carboxylates of divalent tin, carboxylates of tetravalent tin, organic esters of tetravalent titanic acid and amine compounds.

10. The primer composition as claimed in claim 1 further comprising from 5 to 20 parts by weight of iron oxide.

11. The primer composition as claimed in claim 1 wherein the organopolysiloxane as the component (a) contains vinyl groups as part of the groups represented by $R^1$ in an amount not exceeding 0.005 moles per mole of the silicon atoms.

* * * * *